US008968140B1

(12) United States Patent

Wilburn, Jr.

(10) Patent No.: US 8,968,140 B1
(45) Date of Patent: Mar. 3, 2015

(54) ELECTRONICALLY ACTUATED CLUTCH FOR A PLANETARY WINCH

(71) Applicant: Ramsey Winch Company, Tulsa, OK (US)

(72) Inventor: Harold Wilburn, Jr., Haskell, OK (US)

(73) Assignee: Ramsey Winch Company, Tulsa, OK (US)

(*) Notice: Subject to any disclaimer, the term of this patent is extended or adjusted under 35 U.S.C. 154(b) by 0 days.

(21) Appl. No.: 14/201,356

(22) Filed: Mar. 7, 2014

(51) Int. Cl.
*F16H 48/06* (2006.01)
*F16H 1/28* (2006.01)

(52) U.S. Cl.
CPC ........ *F16H 1/28* (2013.01)
USPC ........ 475/156

(58) Field of Classification Search
None
See application file for complete search history.

(56) References Cited

U.S. PATENT DOCUMENTS

| | | | | |
|---|---|---|---|---|
| 2,742,238 | A | 4/1956 | Clarke et al. | |
| 2,892,444 | A | 6/1959 | Perkins | |
| 4,376,476 | A * | 3/1983 | Hagiri | 192/84.1 |
| 4,509,091 | A * | 4/1985 | Booth | 361/154 |
| 4,624,450 | A | 11/1986 | Christison | |
| 4,649,458 | A * | 3/1987 | Arai et al. | 361/152 |
| RE33,140 | E * | 1/1990 | Booth | 361/154 |
| 4,928,925 | A | 5/1990 | Christison | |
| 5,381,297 | A * | 1/1995 | Weber | 361/153 |
| 5,842,684 | A | 12/1998 | Aho | |
| 6,208,498 | B1 * | 3/2001 | Ueda | 361/160 |
| 6,571,773 | B1 * | 6/2003 | Yamakado et al. | 123/490 |
| 6,721,158 | B2 * | 4/2004 | Heinke | 361/152 |
| 6,995,682 | B1 * | 2/2006 | Chen et al. | 340/12.22 |
| 7,270,312 | B1 | 9/2007 | Phipps | |
| 7,740,225 | B1 * | 6/2010 | Estelle | 251/129.05 |
| 7,984,894 | B1 * | 7/2011 | Chauza | 254/344 |
| 8,619,404 | B2 * | 12/2013 | Haller | 361/154 |
| 8,646,587 | B2 * | 2/2014 | Kimes | 192/46 |
| 2006/0201488 | A1 * | 9/2006 | Kohler et al. | 123/479 |
| 2009/0021882 | A1 * | 1/2009 | Haller | 361/154 |
| 2010/0099533 | A1 | 4/2010 | Horsfall et al. | |

FOREIGN PATENT DOCUMENTS

| | | | |
|---|---|---|---|
| CA | 2314584 | A1 * | 2/2001 |
| CA | 2559864 | A1 * | 6/2007 |

OTHER PUBLICATIONS

T-Max Performance Series Winch from www.autoaccessoriesgarage.com website, Jan. 13, 2014.
Avenger Mako TDS Series Winch bought to you by Kingone Winch by Avenger 4×4 Accessories Australia Dec. 15, 2009 from www.hotfrog.com.au website.
Solenoid—Starter Solenoid—Rotary Solenoid, Industrial work Solenoid Construction and Basic Operation and Instruction Sheet for S500-A60 from www.Trombetta.com website, Mar. 5, 2014.

* cited by examiner

*Primary Examiner* — Dirk Wright
(74) *Attorney, Agent, or Firm* — GableGotwals

(57) ABSTRACT

An electronically operated clutch for planetary winch where the clutch is disengaged by a first current level and maintained in the disengaged position by a second current level. The second current level being less than the first current level.

11 Claims, 2 Drawing Sheets

ELECTRONICALLY ACTUATED CLUTCH FOR A PLANETARY WINCH

FIELD OF THE INVENTION

The present invention relates generally to a winch. More particularly, the present invention relates to a solenoid activated clutch assembly for a planetary winch.

BACKGROUND OF THE INVENTION

Winches are used in numerous applications to lift or move heavy loads. Common applications include mounting them on tow trucks to pull a disabled vehicle onto the bed of the tow truck or lift one end of the disabled vehicle so that it can be hauled away. Another common application is to mount it on the front or rear end of a vehicle to assist in retrieving the vehicle where it is stuck.

In order to operate a winch it is necessary to be able to pull line off of the spool as well as be able retrieve the line with a load on it. Pulling line off of the spool or paying it out can be done by running the motor backwards such that the spool unwinds the line. While this method will work, it is time consuming, especially if a significant amount of line must be paid out. In these situations it is beneficial to disengage the spool from the drive mechanism. This allows the spool to rotate freely and for the line to be manually pulled off of the spool. Disengaging the spool is typically accomplished by a clutch mechanism. In the past, operation of the clutch mechanism is accomplished through direct manual control of the clutch. This requires the operator to be standing next to the winch and manually operate a gear lever. As can be imagined if the operator is loading a vehicle or moving another type of large load, standing next to the winch may not be the most convenient or safe location.

Various individuals have attempted to incorporate an electronically operated clutch with a winch having a planetary gear drive, also referred to as a planetary winch. This typically involved an electronic solenoid used to overcome a spring or other bias mechanism to move a plunger from an engaged position to a disengaged position (or vise-versa) relative to the ring gear of the planetary gear drive.

The standard solenoid used on these applications required a significant amount of power to move the plunger from one position to the other. Then once moved, the solenoid must remain energized to stay in the moved position and oppose the bias mechanism. This creates a significant drain on the electrical power source. This problem is compounded by the fact most of these winches are used on vehicle of some sort, such as a tow truck, off road vehicle, tractor or the like. This means the electrical power source is a battery with a limited service life. Thus the amount of time the winch can be used is greatly reduced by operation of the electronically actuated clutch. For this very reason electronically operated clutches are not commonly used.

In addition to depleting battery life, the current draw generates a tremendous amount of heat. If the solenoid remains energized for an extended amount of time the heat buildup will lead to failure of the solenoid. Even keeping the solenoid energized for a minute are two can have detrimental effects on the solenoid.

Others in the field have attempted to address this issue by using a solenoid that moves the plunger in one direction with a given polarity of power. The plunger then moves in the opposite direction when the opposite polarity of power is applied. However this is not optimal because of safety concerns. Namely, it is preferred from a safety standpoint to have plunger move to position of having the ring gear locked in place in the event of a power failure. This ensures the load on the winch remains in one place. This feature is not possible where the solenoid is dependent upon a certain polarity of power in order to move it to another position.

What is needed is an apparatus that allows a winch operator to engage and disengage a clutch without standing next to the winch.

Further what is needed is an electronically operated clutch for planetary gear that can operate on a minimum amount of power consumption. Thus avoiding depletion of the battery life and damage arising from the heat generated.

It is also important that the clutch design engages the clutch, that is, it locks the ring gear in place when there is a power failure.

BRIEF SUMMARY OF THE INVENTION

The present invention achieves these objectives by providing an electronically operated clutch for a planetary winch. The winch motor and electronically operated clutch can be operated via a remote. The clutch is engaged and disengaged by a solenoid. The solenoid is moved to a disengaged position by being energized by a first current level. Once in the disengaged position, the solenoid can be maintained in that position by a second current level. The second current level being less than the first current level. The clutch can be engaged by deenergizing the solenoid. Once deenergized, a bias means moves the solenoid plunger to an engaged position.

The present invention provides an electronically operated clutch for a planetary winch which is capable of maintaining the clutch in a disengaged position with minimal electric power consumption. Thus battery life and operational life are extended. Damage from heat buildup is also reduced The present invention further provides an electronically operated clutch for a planetary winch which will engage the clutch in the event of a power failure or dead battery. This ensures the load held by the winch is not inadvertently dropped or released.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENT

Figure 1:
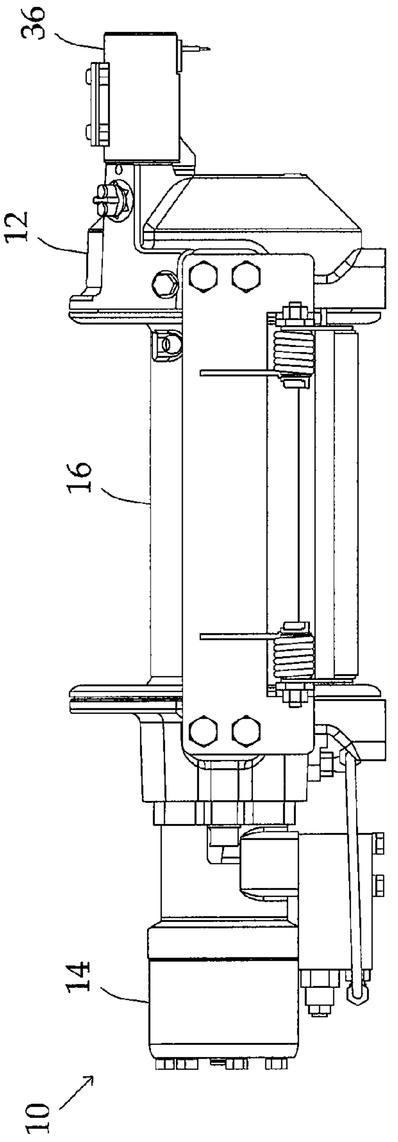
FIG. 1 is a front view of a planetary winch of the present invention.
Figure 2:
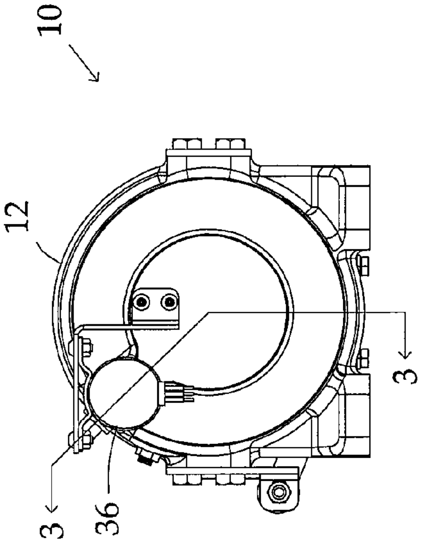
FIG. 2 is a right end view of a planetary winch of the present invention.
Figure 3:
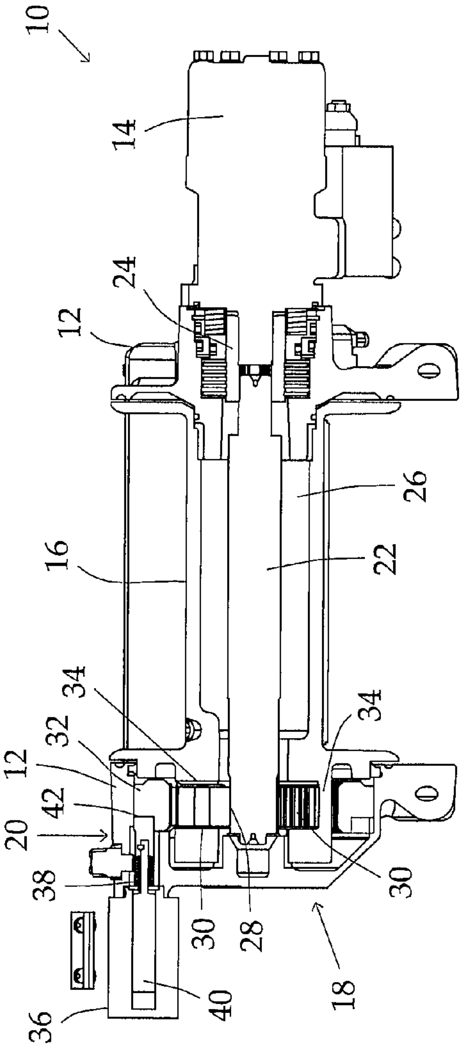
FIG. 3 is a cross sectional view of the winch of the present invention.
Figure 4:
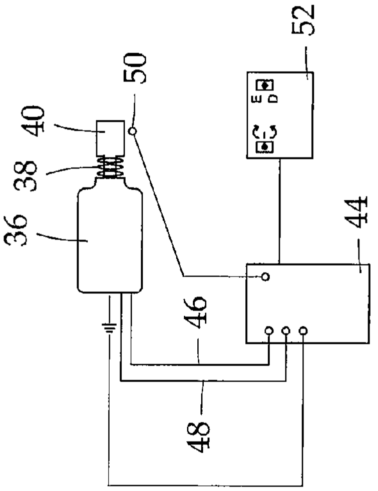
FIG. 4 is a schematic showing the controls of the present invention.

Turning now to the drawings wherein like reference characters indicate like or similar parts throughout, FIGS. 1-3 illustrates a planetary winch 10. It has a case 12 supporting a motor 14, spool 16, gear train 18 and clutch mechanism 20. The motor 14 is typically electric or hydraulic. It is coupled to a first end of a shaft 22 via a coupler 24. The shaft 22 extends through a hollow center 26 of the spool 16. The gear train 18 is comprised of a sun gear 28, a plurality of planet gears 30 and a ring gear 32. The planet gears 30 are coupled to the spool 16 by a plurality of planet pins 34. The planet gears 32 engage with the sun gear 28. The planet gears 30 also engage the ring gear 32 which surrounds the outer perimeter of the orbit of the planetary gears 30. In the preferred embodiment as shown the sun gear 28 is cut into a second end of the shaft 22, however this could also be accomplished by a separate gear coupled to the second end of the shaft 22. It is further possible to practice the present invention by having the motor 14 and gear train 18 located on the same side of spool 16.

For purposes of explanation the condition of the clutch mechanism 20 being disengaged shall mean the spool 16 rotates freely. The condition of the clutch mechanism 20 being engaged shall mean the spool 16 is engaged with the motor 14 via the gear train 18.

The clutch mechanism 20 is mounted to the case 12. It is capable of selectively holding the ring gear 32 in place relative to the case 12 when in an engaged position and allowing the ring gear 32 to rotate relative to the case 12 when in a disengaged position. The clutch mechanism 20 is comprised of a solenoid 36, bias means 38, plunger 40 and one or more holes 42 in the ring gear 32. The bias means 38 can take many forms including but not limited to a spring in either compression or tension. The holes 42 in the ring gear 32 are sized to receive the plunger 40 and located to pass by the plunger 40 as the ring gear 32 rotates around the planet gears 30.

When the clutch mechanism 20 is disengaged, the solenoid 36 is energized. This overcomes the force of the bias means 38 and retracts the plunger 40 into the solenoid 36. When the plunger 40 is in the retracted position the ring gear 32 is free to rotate relative to the case 12. When the clutch mechanism 20 is engaged the solenoid 36 is not energized. The bias means 38 can then move the plunger 40 to an extended position where it or an attached linkage engages one of the holes 42 in the ring gear 32. This locks the ring gear 32 and holds it in place relative to the case 12.

The motor 14 can be operated to rotate in either direction. This causes the shaft 22 and sun gear 28 to rotate in the same direction as the motor 14. As the sun gear 28 rotates, it engages with the planet gears 30 and causes them to rotate about the planet pins 34. When the clutch mechanism 20 is disengaged, the rotation of the planet gears 30 about the planet pins 34 cause the ring gear 32 to rotate about the periphery of the planet gears 30. This also means the ring gear 32 rotates freely relative to the case 12. With the clutch mechanism 20 in the disengaged position the spool 16 can be rotated freely relative to the case 12, regardless of the whether the motor 14 and gear train 16 are rotating. This allows the operator of the winch 10 to pay out or pull line off of the spool 16.

When the clutch mechanism 20 is engaged the ring gear 32 is locked relative to the case 12. Thus the rotation of the motor 14, shaft 22, sun gear 28 and planet gears 30 cause the planet gears 30 to orbit about the sun gear 28 as the planet gears 30 engage with the sun gear and the fixed ring gear 32. The orbit of the planet gears 30 causes the spool 16 to rotate relative to the case 12.

The control circuit 44 for the solenoid 36 provides a first current level 46 when first activated to retract the plunger 40. This disengages the clutch mechanism 20. Once the plunger 40 is moved to the retracted position, the control circuit 44 provides a second current level 48 which is less than the first current level 46. The second current level 48 is used to maintain the plunger 40 in the retracted position. To engage the clutch mechanism 20, the operator operates to control circuit 44 to deenergize the solenoid 36. This allows the bias means 38 to move the plunger 40 to the extended position where it engages with a hole 42 in the ring gear 32. The clutch mechanism 20 will also engaged in the event of a power failure.

The present invention can be used in various voltage systems. Because winches are typically found on vehicles, 12 volt and 24 volt systems are most likely to occur. In the preferred embodiment the first current level 46 is in the range of 20 amps to 100 amps, preferably about 70 amps and the second current level 48 is in the range of 0.5 amps to 5 amps, preferably about 0.88 amps. The length of time the first current level 46 is provided to the solenoid 36 may vary depending upon design requirements. In the preferred embodiment this is in a range of 250 milliseconds to 1 second, preferably 500 milliseconds. Ideally it would be no longer than the time necessary for the solenoid 36 to retract the plunger 40. It is possible the clutch mechanism 20 would include a sensor 50 that senses when the clutch mechanism 20 has been disengaged and sends a signal to the control circuit 44. Once the control circuit 44 receives a signal from the sensor 50, the current level is changed to the second current level 48.

The control circuit 44 and winch may be operated via a remote 52. The remote 52 may be wired to the winch 10 or may be wireless. The remote 52 provides an interface with both the clutch mechanism 20 and motor 14 operation and may include other operational features.

The present invention as described above has the added advantage of locking the rotation of the spool 16 in the event of a power failure. This secures any load that might be on the winch 10. The present invention could also be practiced where the bias means 38 of the clutch mechanism 20 holds the plunger 40 in the retracted position. However this embodiment would not inherently have the added safety feature of locking the rotation of the spool 16 in the event of a power failure.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. A planetary winch with an electronically operated clutch comprising:

a case;

a drive motor;

a drive shaft with a first end coupled to the drive motor and a second end coupled to a sun gear;

a plurality of planet gears coupled with a spool and engaged with the sun gear;

a ring gear engaged with the plurality of planet gears;

a clutch mechanism capable of selectively holding the ring gear in place relative to the case when in an engaged position and allowing the ring gear to rotate along an outer periphery of the planet gears and relative to the case when in a disengaged position;

a solenoid capable of moving the clutch mechanism between the engaged position and the disengaged position; and a control circuit;

wherein the control circuit provides a first current level to the solenoid to move the solenoid from the engaged position to the disengaged position and a second current level to the solenoid to maintain the solenoid in the disengaged position.

2. The planetary winch of claim 1 further comprising:

the first current level being within a range of 20 to 100 amps.

3. The planetary winch of claim 2 further comprising:

the first current level having a duration within the range of 250 ms to 1 second.

4. The planetary winch of claim 1 further comprising:

the second current level being within a range of 0.5 to 5 amps.

5. The planetary winch of claim 1 further comprising:

a sensor capable of sensing when the clutch mechanism is disengaged and capable of sending a signal to the control circuit.

6. The planetary winch of claim 1, said clutch mechanism further comprising:

at least one hole in the ring gears, sized and located to receive the plunger when the clutch mechanism is in the engaged position.

7. The planetary winch of claim 1, said clutch mechanism further comprising:

a linkage attached to the plunger; and at least one hole in the ring gears, sized and located to receive the linkage when the clutch mechanism is in the engaged position.

8. The planetary winch of claim 1, further comprising:

a remote providing an interface for operation of the clutch mechanism and motor.

9. The planetary winch of claim 8, further comprising:

a wireless connection between the remote and the control circuit.

10. The planetary winch of claim 8, further comprising:

a wired connection between the remote and the control circuit.

11. A planetary winch with an electronically operated clutch comprising:

a case;

a drive motor;

a drive shaft with a first end coupled to the drive motor and a second end coupled to a sun gear;

a plurality of planet gears coupled with a spool and engaged with the sun gear;

a ring gear engaged with the plurality of planet gears;

a clutch mechanism capable of selectively holding the ring gear in place relative to the case when in an engaged position and allowing the ring gear to rotate along an outer periphery of the planet gears and relative to the case when in a disengaged position;

a solenoid capable of moving the clutch mechanism between the engaged position and the disengaged position;

a control circuit;

a remote providing an interface for operation of the clutch mechanism and motor;

a sensor capable of sensing when the clutch mechanism is disengaged and capable of sending a signal to the control circuit;

wherein the control circuit provides a first current level to the solenoid to move the clutch from the engaged position to the disengaged position and a second current level to the solenoid to maintain the clutch mechanism in the disengaged position once the control circuit receives the signal the sensor.

* * * * *